May 27, 1947. A. SENKOWSKI 2,421,164
SLEEVE BALANCING ARRANGEMENT FOR RADIAL ENGINES
Filed May 24, 1945 2 Sheets-Sheet 1
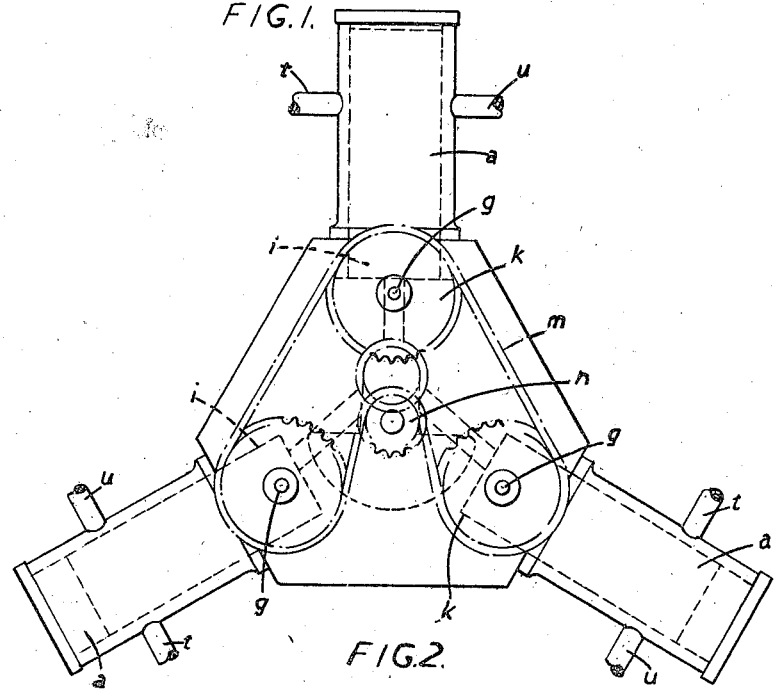
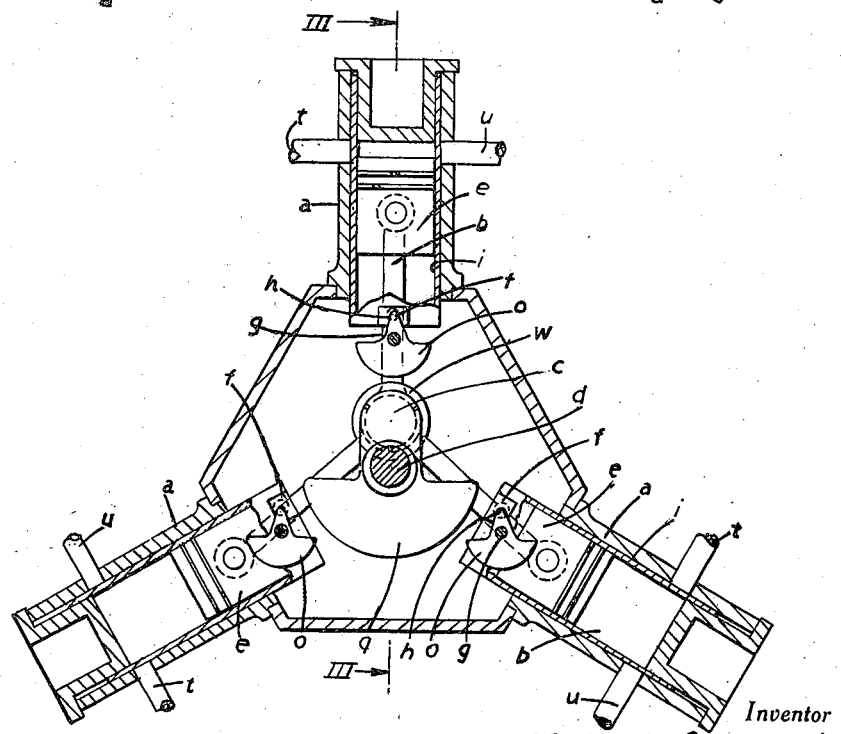
Inventor
ALEXANDER SENKOWSKI
By
Emery Holcombe & Blair
Attorney

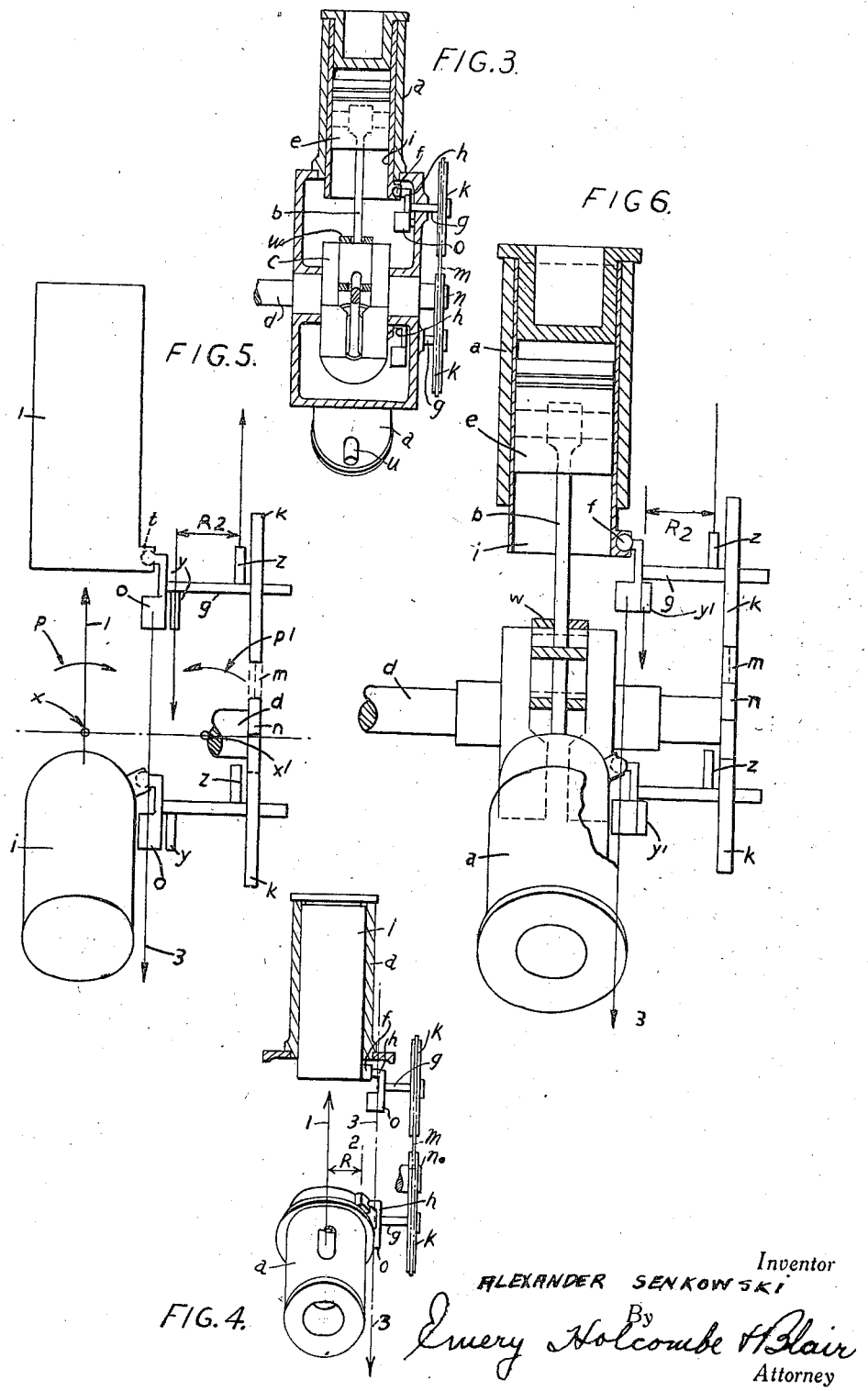

Patented May 27, 1947

2,421,164

UNITED STATES PATENT OFFICE 2,421,164

SLEEVE BALANCING ARRANGEMENT FOR RADIAL ENGINES

Alexander Senkowski, Cheltenham, England

Application May 24, 1945, Serial No. 595,645
In Great Britain April 15, 1944

4 Claims. (Cl. 123—81)

1

This invention relates to radial cylinder engines having a sleeve valve in each cylinder operated by an external half-speed crank mechanism rotating in the opposite direction to the engine crank shaft. The invention is particularly applicable to a three-cylinder engine of this type, although it may be applied to engines of other numbers of cylinders. It is the object of this invention to provide means for counter-balancing the out-of-balance forces and moments which arise in a radial engine having sleeve valves operated in this manner.

In a three-cylinder radial engine, in which the driving cranks for the valve sleeves rotate in the opposite sense to the crank shaft, an out-of-balance force is produced rotating at half engine speed oppositely to the crank shaft, that is to say in the direction of the cranks which actuate the sleeves and parallel to these cranks. There is also an out-of-balance moment rotating at the same speed and in the same plane as the out-of-balance force mentioned above. The axis of this moment is also in the plane of the cylinders and is always at right angles to the direction of the out-of-balance force. Hence the forces producing the out-of-balance moment are in the same plane as the forces responsible for the out-of-balance force first mentioned above. This plane is parallel to the sleeve-driving cranks, the direction of the force and moment rotating about the centre line of the crankshaft in this plane.

Under these circumstances it is clear that for correct counterbalancing, a force of the same value as the out-of-balance force, at a sleeve radius from the central plane of the engine, and in opposition of phase to the out-of-balance force, should counterbalance both the force and the moment. What is required is to locate suitable counterbalance masses, one on each sleeve-driving crank shaft, each developing one-third of the counter-balancing force required. Owing to the design of the engine, however, the counterbalancing masses must be at a greater distance than the radius of the sleeves from the central plane of the cylinders, in order that they may rotate clear of the sleeve valves, and this tends to give an overbalancing effect for the moment. As a compromise, the counterbalancing masses may be made rather less than they should be for complete balance, or if they are of the required size, additional means may be provided for counterbalancing as fully as is desired the out-of-balance moment due to the overbalancing effect above referred to.

2

The invention is illustrated in the accompanying drawings in which:

Figure 1 shows a somewhat diagrammatic elevation of a three-cylinder engine of a type to which the invention is applicable;

Figure 2 is a diagrammatic front view, and

Figure 3 is a diagrammatic side view partly in section on the line III—III of Figure 2, showing the way in which the invention is applied to such an engine;

Figure 4 is a diagram corresponding with Figure 3;

Figures 5 and 6 are further diagrams hereinafter explained.

Referring to the drawings, Figures 1 to 4, it will be seen that the engine has three cylinders $a$ with their pistons $e$ operating by connecting rods $b$ on the single crank $c$ of the rotating crank shaft $d$. The crank has its own counterbalance mass $q$. The slippers of the rods $b$ are held to the crank by collars $w$ at each side. Each cylinder is of the sleeve-valve type having a sleeve $i$ within it to which is imparted an oscillating and reciprocating movement; the mechanism for producing this movement is illustrated in Figures 2 and 3. Each sleeve $i$ has a projection $f$ upon it formed as a socket, engaged by a round-headed crank pin $h$ on short crank shaft $g$. Each crank shaft $g$ carries a chain wheel $k$, a single chain $m$ being carried round the three chain wheels $k$ and around a driving sprocket $n$ on the crankshaft $d$. The sprocket $n$ is half the size of the chain wheels $k$ so that the crank shafts $g$ are driven at half the speed of the engine. Each crank $h$ is on a plate carrying at the side opposite to crank $h$ a counterbalancing mass $o$. Each cylinder has inlet and outlet ports indicated diagrammatically at $t$ and $u$ controlled by the sleeve valves $i$ as usual.

If the out-of-balance force due to each sleeve $i$ is S, the magnitude of the out-of-balance force to be compensated is 1.5 S in the central plane $l$ of the three cylinders $a$, Figure 4. The out-of-balance moment is 1.5 RS where R is the radius of each sleeve $i$. Both of these would be counterbalanced by a force of the value of 1.5 S in the plane 2 at the radius R of the sleeve in front of the central plane $l$ of the cylinders. If three counterweights such as $o$ on the three crank shafts $g$ which operate the sleeves, could be arranged to work with their centres of mass in the plane 2, each counterweight having a value 0.5 S, this would give complete compensation both to the out-of-balance force and the out-of-balance moment. The counterweights however cannot be in the plane 2 because they would foul the sleeves and they have therefore to be in a plane 3 further from the central plane 1. Their value, therefore, is made rather less than 0.5 S each, say 0.4 S, because of the greater distance of the plane 3 from the central plane 1, and this gives approximately 80% compensation both to the out-of-balance force and the out-of-balance moment. This may be sufficient in many cases but a more complete compensation both of the out-of-balance force and the moment can be attained as follows:

If the masses $o$ are made of the size required so that the sum of the forces which they produce equals and opposes the rotating out-of-balance force due to the sleeve valve mechanism, they produce an overbalancing moment or couple greater than is required for correct counterbalancing. This excess couple acts in a clockwise sense about the centre $x$ of the crank shaft in the median plane of the cylinders and is represented by the arrow $p$ in Figure 5, in which figure the planes 1 and 3 are numbered as before. Additional counterweights $y$ and $z$ are now attached to the sleeve-driving crank shafts $g$ spaced apart by the distance R2 and so situated around the shafts $g$ that they produce together a counter-clockwise couple represented by the arrow $p^1$ acting about a point $x^1$ in line with the centre of the crank shaft but out toward the right. If the couple represented by the arrow $p^1$ is made equal and opposite to the couple represented by arrow $p$, these two couples balance out and no new unbalanced forces are introduced, so that the balancing of the forces and couples can be made as complete as desired.

It is not necessary, however, to provide the separate masses $y$ as in Figure 5, but these can be combined with the masses $o$ so that the only additional masses required are those represented at $z$. This refinement is shown in Figure 6 where the references are the same as in the earlier figures, but the masses $y$ are replaced by extensions $y^1$ on the masses $o$, the masses $z$ being at a distance R2 as before from the plane in which the masses $y^1$ act, so that the balancing couple introduced is the same as in Figure 5. It will be clear that by the means last described above there is no difficulty in making the counterbalancing of the unbalanced forces and couples as exact as may be required.

I claim:

1. A radial cylinder engine comprising a plurality of cylinders, a sleeve valve in each cylinder, a piston within each sleeve valve, a crank shaft with a single crank, connecting rods between said pistons and said crank, operating mechanism for said sleeve valves comprising half speed shafts one for each sleeve valve with cranks thereon adapted to oscillate said sleeve valves, gearing between said crankshaft and said half speed shafts adapted to rotate the latter in the opposite direction of rotation to the crank shaft, and counterbalance masses on each of said half speed shafts so disposed and of such a value that together they will counterbalance a large proportion of both the out-of-balance forces and moments due to the rotation of the said operating mechanism for said sleeve valves.

2. A radial cylinder engine comprising three cylinders, a sleeve valve in each cylinder, a piston within each sleeve valve, a crank shaft with a single crank, connecting rods between said pistons and said crank, operating mechanism for said sleeve valves comprising half speed shafts one for each sleeve valve, cranks on said half speed shafts and means connecting them to said sleeve valves, gearing between said crank shaft and said half speed shafts adapted to rotate each half speed shaft in the opposite direction of rotation to the crank shaft, and counterbalance masses on said half speed shafts opposite to the cranks thereon and so disposed as to move clear of said sleeve valves as said half speed shafts rotate, said counterbalance masses being of such value that together they counterbalance a large proportion of both the out-of-balance forces and moments due to the rotation of said operating mechanism for said sleeve valves.

3. A radial cylinder engine comprising a plurality of cylinders, a sleeve valve in each cylinder, a piston within each sleeve valve, a crank shaft with a single crank, connecting rods between said pistons and said crank, operating mechanism for said sleeve valves comprising half speed shafts one for each sleeve valve with cranks thereon adapted to oscillate said sleeve valves, gearing between said crank shaft and said half speed shafts adapted to rotate the latter in the opposite direction of rotation to the crank shaft, and counterbalance masses on each of said half speed shafts, comprising one mass adjacent and in opposition to the crank on each said half speed shaft, and one mass spaced apart from the first mentioned mass and in opposition thereto, said masses being so diposed and of such value that together they counterbalance a large proportion of both the out-of-balance forces and the moments due to the rotation of said operating mechanism for said sleeve valves while producing a couple opposing an out-of-balance moment due to the disposition of said first mentioned balancing mass on its shaft in relation to its valve sleeve.

4. A radial cylinder engine comprising a plurality of cylinders, a sleeve valve in each cylinder, a piston within each sleeve valve, a crank shaft with a single crank, connecting rods between said pistons and said crank, operating mechanism for said sleeve valves comprising half speed shafts one for each sleeve valve with cranks thereon adapted to oscillate said sleeve valves, gearing between said crank shaft and said half speed shafts adapted to rotate the latter in the opposite direction of rotation to the crank shaft, and counterbalance masses on each of said half speed shafts, comprising a counterbalance mass oppositely disposed to the crank on each such shaft and adapted to counterbalance unbalanced forces due to the rotation of said crank and associated movements of said sleeve valve, and to overbalance moments due to the said crank and sleeve valve, and additional counterbalancing means on said half speed shaft so disposed thereon as to produce during rotation of said shaft a couple opposing the excess moment due to said counterbalance mass.

ALEXANDER SENKOWSKI.

REFERENCES CITED

The following references are of record in the file of this patent:

UNITED STATES PATENTS

| Number | Name | Date |
|---|---|---|
| 1,937,123 | Niven | Nov. 28, 1933 |
| 1,944,013 | Meyer | Jan. 16, 1934 |
| 2,011,820 | Meyer | Aug. 20, 1935 |
| 2,013,163 | Meyer | Sept. 3, 1935 |